United States Patent [19]

Sekmakas et al.

[11] 4,312,799
[45] Jan. 26, 1982

[54] WATER SOLUBLE AMINE RESINS WHICH ARE MANNICH BASES

[75] Inventors: Kazys Sekmakas, Palatine; Raj Shah, Schaumburg, both of Ill.

[73] Assignee: DeSoto, Inc., Des Plaines, Ill.

[21] Appl. No.: 160,606

[22] Filed: Jun. 18, 1980

[51] Int. Cl.$^3$ .................... C08L 61/26; C08G 59/14
[52] U.S. Cl. ............................ 260/29.3; 204/181 C; 260/29.2 EP; 260/29.4 R; 528/107
[58] Field of Search .......... 260/29.3, 29.2 EP, 29.4 R; 525/396; 204/181 C; 528/107

[56] References Cited

U.S. PATENT DOCUMENTS

| | | | |
|---|---|---|---|
| 3,994,989 | 11/1976 | Kempter et al. | 260/29.3 |
| 4,001,155 | 1/1977 | Kempter et al. | 260/29.3 |
| 4,086,292 | 4/1978 | Kempter et al. | 525/484 |
| 4,134,932 | 1/1979 | Kempter et al. | 525/481 |
| 4,189,450 | 2/1980 | Kempter et al. | 260/29.3 |

FOREIGN PATENT DOCUMENTS 2357075 5/1975 Fed. Rep. of Germany.
1457932 12/1976 United Kingdom.

*Primary Examiner*—Theodore E. Pertilla
*Attorney, Agent, or Firm*—Dressler, Goldsmith, Shore, Sutker & Milnamow, Ltd.

[57] ABSTRACT

An amine resin soluble in water with the aid of an acid is produced by reacting a dihydric phenolic compound with a stoichiometric deficiency of aromatic diepoxide, then reacting the product with formaldehyde to generate methylol groups on the aromatic moieties present in the product, then reacting at least a portion of the methylol groups with monosecondary amine to produce a Mannich base, and then reacting the Mannich base with additional diepoxide in an amount of from 0.5 to 2 epoxy equivalents per epoxy equivalent in the initially used diepoxide.

6 Claims, No Drawings

WATER SOLUBLE AMINE RESINS WHICH ARE MANNICH BASES

DESCRIPTION

TECHNICAL FIELD

This invention relates to water soluble amine resins which are Mannich Bases. These resins are particularly useful in cathodic electrocoating.

BACKGROUND ART

Water soluble amine resins are potentially useful in cathodic electrocoating, and numerous efforts to develop resins which solubilize in water without excessive acidity, which do not settle out on storage, and which electrodeposit at the cathode and cure to develope good properties have been carried out. It is particularly desirable to employ a resinous system which will cure at relatively low temperature, such as 350° F., but this has frequently required the presence of blocked polyisocyanates which introduce undesirable expense.

It is also desirable to employ resins which possess a bisphenolic backbone, as is found in epoxy resins, since such resins possess good physical and chemical properties.

An interesting effort in this direction is provided in U.S. Pat. No. 4,001,155 in which a bisphenol is reacted with up to 4 molar proportions of formaldehyde and then with about the same molar proportion of monosecondary amine to provide a Mannich base which is then reacted via its phenolic OH groups with from 0.6 to 1.3 equivalents of epoxide functionality per mol of the diphenol which is reacted with formaldehyde. The resulting amine-functional resin is solubilized in water with the aid of an acid, and is useful in cathodic electrocoating.

In contrast with the prior art, in this invention it is desired to more uniformly distribute the solubilizing amine groups and to thereby increase the proportion of epoxy-functional material which can be incorporated. This improves the stability of the aqueous solutions and dispersions which are formed. More particularly, the solubility is improved and the unreacted monosecondary amine adducts with the diepoxide so as to reduce the conductivity of the aqueous system which is formed. Indeed, prior to reaction with the diepoxide, water solubility with the aid of an acid in this invention is poor, but after reaction with the diepoxide, solubility is excellent, and this is surprising. Indeed, the systems of this invention are more complex than those of the prior art, so the avoidance of gelation is itself surprising.

DISCLOSURE OF INVENTION

In accordance with this invention, a dihydric phenolic organic compound, preferably a bisphenol, is reacted with a stoichiometric deficiency of a diepoxide, and then the product is reacted with formaldehyde and monosecondary amine to produce a Mannich base. The reaction with formaldehyde generates methylol groups, not only on the terminal aromatic groups, but also on the aromatic moieties within the resin structure formed by reaction with the diepoxide which is preferably an aromatic diepoxide. To encourage this formation of methylol groups throughout the resin structure, while U.S. Pat. No. 4,001,155 normally uses from 2–3 moles of formaldehyde per mol of bisphenol, we prefer to use more than 3.5 moles of formaldehyde per mol of starting diphenolic organic compound, and we preferably use more than 4 moles of formaldehyde per mol of starting bisphenol. This enables resins of higher average molecular weight to be dispersed in the aqueous electrocoating bath, and it also allows a larger proportion of unreacted methylol groups provided by the reaction of formaldehyde to remain in the Mannich base which is produced, and this lowers the baking conditions which are required for an adequate cure of electrodeposited coatings. This Mannich base is then reacted with epoxide-functional material, preferably a diepoxide, to provide the product which is solubilized in water with the aid of an acid.

In contrast with the teachings of U.S. Pat. No. 4,001,155, we normally use more than 1.5 equivalents of epoxide functonality per mol of dihydric reaction product, and we prefer to use more than 2 equivalents of epoxide on the same basis since this importantly improves solubility in water.

The bisphenols which can be used in accordance with this invention are the same as those described in U.S. Pat. No. 4,001,155, namely, those having the structure:

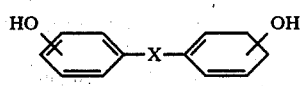

wherein X is a straight chain or branched chain divalent aliphatic radical of from 1 to 3 carbon atoms, or $>SO_2$, $>SO$, or $-O-$.

This known class of compounds is broadly referred to as bisphenols. The preferred bisphenol is bisphenol A in which X is 2-2 propylidene and the two OH groups are in the para position. Other bisphenols which can be used are illustrated by 4,4'thiodiphenol and 4,4'-sulfonyl diphenol. Dihydric phenolic organic compounds other than bisphenols are illustrated by resorcinol.

The diepoxides are aromatic diepoxides, preferably diglycidyl ethers of a bisphenol having a molecular weight in the range of about 350 to about 5000, preferably 350–600. The diepoxides can be used in admixture with monoepoxide so long as there is a 1,2-epoxy equivalency of at least about 1.4. From 0.3 to 0.6 equivalents of epoxide are used per equivalent of phenolic OH in the dihydric compound.

The reaction with formaldehyde is conventional and is illustrated in the examples.

Any monosecondary amine may be used, exactly as in the prior art. These have the formula R-NH-R' where R and R' may be the same or different and are desirably $C_1$–$C_8$ alkyl and the corresponding alkanol. These are illustrated by di-N-butyl amine or di-N-ethyl amine. Diethanol amine will illustrate the hydroxy functional amines which are useful. The dialkyl amines and the hydroxy alkyl amines are desirably used in admixture. Cure and solubility are enhanced by leaving at least about 20% of the methylol groups unreacted by using a stoichiometric deficiency of the amine component.

The reaction between the methylol derivative and the monosecondary amine is conventional, and it will be illustrated in the examples.

The resulting Mannich base is then reacted with additional diepoxide which need not be aromatic, but which may be of the same type described previously. From 0.5 to 2 epoxy equivalents are used per epoxy equivalent in the diepoxide initially used, preferably from 1 to 1.5 equivalents on the same basis.

The final product is then dispersed in water with the aid of a solubilizing acid. The solubilizing acids are well known and will be illustrated herein by acetic acid. The acid proportion is governed by the acidity of the final bath which may range from quite acid to slightly alkaline. The pH is preferably in the range of pH 5-9, most preferably 6-8.5.

The products of this invention contain methylol groups and hence self cure, but it is usually desirable to add a curing agent to the aqueous system which is applied to enhance the cure. Aminoplast resins and phenoplast resins are well known for this purpose and are useful herein in an amount of from 2% to about 35%, based on the weight of the Mannich base-epoxide reaction product. The selection of the curing agent which is optionally used is illustrated in the Examples, but is not a feature of this invention.

Best Mode for Carrying Out the Invention

EXAMPLE 1

543 grams of a diglycidyl ether of bisphenol A having an epoxide equivalent weight of 181 (Dow DER 333 [3 equivalents]) and 680 grams of bisphenol A (6 equivalents) and 270 grams of 2-butoxy ethanol solvent are charged to a reactor and heated to 170° C. This temperature is maintained for 5 hours to provide a bisphenol-terminated derivative. The product is cooled to 30° C. and 550 grams of isopropanol solvent and 400 grams of paraformaldehyde (13.3 equivalents) are added over 30 minutes with agitation. The formaldehyde reacts with the activated positions on the aromatic rings in an exothermic reaction to provide methylol functionality. The exotherm increases the temperature to about 40° C. After 2 hours the reaction is complete.

440 grams of di-N-butyl amine (3.4 equivalents) and 500 grams of diethanol amine (4.76 equivalents) are premixed and added to the reactor a 30 minute period with agitation at 30° C. and the temperature gradually increases as a result of an exothermic reaction to 80° C. and the reaction mixture is held at that temperature for 3 hours to provide a Mannich base.

600 grams (3.3 equivalents of the same diglycidyl ether used initially) are added over a 30 minute period at 75° C. together with 120 grams of methyl ethyl ketone solvent. The mixtrue is held at 75° C. for 4 hours and is then cooled.

EXAMPLE 2

100 grams of the 67.1% solids solution produced in Example 1 are mixed with 14 grams of methylatedethylated benzoguanamine-formaldehyde condensate (American Cyanamide product XM 1123) and 6 grams of acetic acid. 680 grams of deionized water are then added slowly with rapid agitation to disperse the polymer and the cross-linker the aqueous medium. The pH of the resulting solution is 6.4.

Zinc phosphate treated steeel panels were coated with the epoxy-based cationic polymer solution produced in Example using a unidirectional electrical current to deposit the resins on the panels as cathode. The following results were obtained.

Using 75 volts for electrodeposition, a film 0.3 mil in thickness was obtained. At 100 volts, the film was 0.55 mil and at 150 volts the film had a thickness of 0.75 mil. These coated steel panels were rinsed after electrodeposition with deionized water and baked at 375° F. for 20 minutes. The baked coating passed 100 double rubs with a methyl ethyl ketone-saturated cloth and had excellent flexibility as indicated by passing a 60 inch/pound reverse impact test. The cured films were very hard (4H pencil hardness) and this is an achievement keeping in mind the excellent flexibility which is also present.

What is claimed is:

1. An amine resin which is soluble in water with the aid of an acid, produced by reacting a bisphenol with a stoichiometric deficiency of a diglycidyl ether of a bisphenol having a 1,2epoxy equivalency of at least about 1.4 and a molecular weight of about 350 to about 5000, there being from 0.3 to 0.6 equivalents of epoxide in said diglycidyl ether per equivalent of phenolic OH in said bisphenol, then reacting the product with more than 3.5 moles of formaldehyde per mol of starting bishpenol to generate methylol groups, then reacting with a mixture of $C_1$-$C_8$ dialkyl amine and diethanol amine to produce a Mannich base, and then reacting said Mannich base with additional diepoxide in an amount of from 0.5 to 2 epoxy equivalents per epoxy equivalent in the initially used diepoxide.

2. An amine resin as recited in claim 1 in which said diglycidyl ether of a bisphenol has a molecular weight in the range of 350 to 600.

3. An amine resin as recited in claim 1 in which more than 4 moles of formaldehyde are used per mol of starting bisphenol.

4. An amine resin as recited in claim 1 in which said Mannich base is reacted with additional diepoxide in an amount of from 1 to 1.5 epoxy equivalents per epoxy equivalent in the initially used diglycidyl ether.

5. An amine resin as recited in claim 1 dispersed in water with the aid of an acid to provide a bath having a pH in the range of 5-9.

6. A water dispersion as recited in claim 5 in which an aminoplast or phenoplast resin is present in admixture with said amine resin to enhance the cure thereof.

7. An amine resin as recited in claim 1 dispersed in water with the aid of an acid to provide a bath having a pH in the range of 6-8.5, said amine resin being in admixture with an aminoplast resin.

* * * * *